United States Patent
Cooper et al.

(10) Patent No.: US 9,060,253 B2
(45) Date of Patent: Jun. 16, 2015

(54) IDENTIFYING AND BLOCKING MOBILE MESSAGING SERVICE SPAM

(71) Applicant: CELLCO PARTNERSHIP, Basking Ridge, NJ (US)

(72) Inventors: Bradley D. Cooper, Orchard Lake, MI (US); Kenneth M. Potas, Carleton, MI (US); Lodema M. Steinbach, Clayton, CA (US); Sethumadhav Bendi, Walnut Creek, CA (US)

(73) Assignee: Cellco Partnership, Basking Ridge, NJ (US)

( * ) Notice: Subject to any disclaimer, the term of this patent is extended or adjusted under 35 U.S.C. 154(b) by 77 days.

(21) Appl. No.: 13/843,358

(22) Filed: Mar. 15, 2013

(65) Prior Publication Data

US 2014/0274171 A1    Sep. 18, 2014

(51) Int. Cl.
| | |
|---|---|
| H04M 1/66 | (2006.01) |
| H04M 1/725 | (2006.01) |
| H04M 3/42 | (2006.01) |
| G06F 15/16 | (2006.01) |
| G06F 15/173 | (2006.01) |
| H04W 4/12 | (2009.01) |
| H04L 12/58 | (2006.01) |

(52) U.S. Cl.
CPC *H04W 4/12* (2013.01); *H04L 51/00* (2013.01)

(58) Field of Classification Search
CPC .............................. H04L 51/12; H04L 12/585
USPC ........... 455/410, 412.1, 414.1, 466; 709/206, 709/224
See application file for complete search history.

(56) References Cited

U.S. PATENT DOCUMENTS

| | | | | |
|---|---|---|---|---|
| 7,617,285 | B1 * | 11/2009 | Hartmann | 709/206 |
| 2002/0119794 | A1 * | 8/2002 | Byers et al. | 455/466 |
| 2005/0020289 | A1 * | 1/2005 | Kim et al. | 455/466 |
| 2006/0053203 | A1 * | 3/2006 | Mijatovic | 709/206 |
| 2008/0082658 | A1 * | 4/2008 | Hsu et al. | 709/224 |
| 2009/0216841 | A1 * | 8/2009 | Choi et al. | 709/206 |

* cited by examiner

*Primary Examiner* — Dung Hong (57) ABSTRACT

Systems and method for identifying and blocking short messaging service spam are disclosed. In some aspects, a first mobile messaging service message is received from a messaging source in a node of a mobile communication network, the first mobile messaging service message being addressed to a destination mobile device. The first mobile messaging service message is forwarded through the mobile communication network for delivery to the destination mobile device. Whether or not the first mobile messaging service message meets a spam messaging criterion is determined, where determining whether or not the first mobile messaging service message meets the spam messaging criterion occurs in parallel with forwarding the first mobile messaging service message through the mobile communication network. Information identifying the messaging source as a spam source is stored, upon determining that the first mobile messaging service message meets the spam messaging criterion.

24 Claims, 5 Drawing Sheets

IDENTIFYING AND BLOCKING MOBILE MESSAGING SERVICE SPAM

BACKGROUND

In recent years, mobile messaging services have become more commonly used, as more and more people own cellular phones or smart phones and become familiar with the features of the mobile devices. Mobile messaging services include various services where a message sent is from and/or is intended for delivery to a mobile device via a mobile communication network. The sender and the receiver may both be mobile device(s) associated with telephone numbers, having associated account(s) with a cellular communication service provider. For example, mobile messaging services include: short messaging service (SMS), enhanced messaging service (EMS), and multimedia messaging service (MMS). SMS allows for the exchange of short text messages (e.g., 160 characters or fewer per message), in many cases, between mobile devices. For example, a SMS message can include the words "I am done with school. Can you pick me up?" However, SMS may also provide transport for request messages and responsive information (e.g. of a joke of the day) and/or notifications (e.g. of news or other events). EMS messages are similar to SMS messages but can also include text formatting (e.g., bold, italic, or underlined text). MIMS messages are similar to EMS or SMS messages and can also include multimedia content (e.g., photograph(s) or video(s)).

During the last few years, the cost of sending messages via mobile messaging services has greatly decreased, with many mobile service providers now offering unlimited messaging plans. Mobile messaging service communication is convenient for users due to its speed and reliability. As a result of the decreased cost of mobile messaging plans, the prevalence of spam transmitted via mobile messaging services has increased. Spam messages are typically undesirable to the recipients and may include inappropriate content, malicious links, unintelligible text, etc. Traditional spam filters, for example spam filters used in the email context, may not be optimal in the mobile messaging space, as traditional spam filters delay receipt of messages by recipients due to the need to review each message to determine whether the message should be placed in the default inbox or the spam folder. As the foregoing illustrates, an approach for identifying and blocking spam in mobile messaging services, while maintaining the speed and reliability of non-spam transmissions in mobile messaging services, may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various techniques and equipment disclosed herein relate to identifying and blocking spam in mobile network messaging services such as short message service (SMS) messages. The SMS or other types of mobile service messages (e.g., enhanced messaging service (EMS) or multimedia messaging service (MMS)) may originate from a mobile device associated with a mobile telephone number or a mobile telecommunications account or any device (mobile or not mobile) associated with a mobile telephone number. In many examples, the mobile service messages are addressed for delivery to one or more mobile devices, although the spam identification and blocking may also apply to mobile originated messages addressed to non-mobile equipment (e.g. to a server to request an email or a value-added service).

As set forth above, during the last few years, the cost of sending messages via mobile messaging services has greatly decreased, with many mobile service providers now offering unlimited messaging plans. Mobile messaging service communication is convenient for users due to its speed and reliability. As a result, some malicious users transmit spam messages via mobile messaging services. However, traditional spam filters, for example spam filters used in the email context, may not be optimal in the mobile messaging space. This is because the traditional spam filters delay receipt of messages by recipients due to the need to review each message to determine whether the message should be placed in the default inbox or the spam folder. As the foregoing illustrates, a new approach for identifying and blocking spam in mobile messaging services may be desirable.

According to some aspects of the subject technology, when a short message service center (SMSC) receives, from a transmitting device, a message for transmission to destination device(s), the SMSC determines whether the transmitting device is flagged as a spammer. If the transmitting device is not flagged as a spammer, the SMSC transmits the message to the destination device(s). The SMSC also determines whether the message is spam. If the message is determined to be spam, the transmitting device is flagged as a spammer. If the transmitting device is flagged as a spammer, the SMSC first determines whether the message is spam. If the message is not spam, the message is transmitted to the destination device(s). However, if the message is spam, the message is not transmitted to the destination device(s). A device that is flagged as a spammer may be unflagged by meeting certain criteria (e.g., not sending any spam messages for a predetermined time period). The criteria for unflagging the device previously flagged as the spammer can include both automatic criteria and manual user action-based criteria. The automatic criteria can include, for example, the device not sending any spam messages for a predetermined time period, the device installing an anti-spam application, etc. The manual user action-based criteria can include, for example, a user notifying the service provider that he/she is not a spammer, for example, by visiting a store or calling a call center of the service provider. The manual user action-based criteria can include a user disabling the device from sending the same message to more than a threshold number (e.g., five) of recipients to prevent spam messages from being sent to a larger number (e.g., 5,000) of recipients.

In some implementations, device(s) to which spam messages were directed may be notified, for example, at predetermined intervals, of the number of spam messages blocked or the number of spam message sources blocked. The notifications can also be provided to law enforcement, in jurisdictions with laws against the transmission of spam messages, or to other entities within the mobile communication network. In some examples, additional action(s) can be taken against sender(s) of mobile messaging service messages that are identified as spam, for example, account suspensions or removal from unlimited messaging plans.

Figure 1:
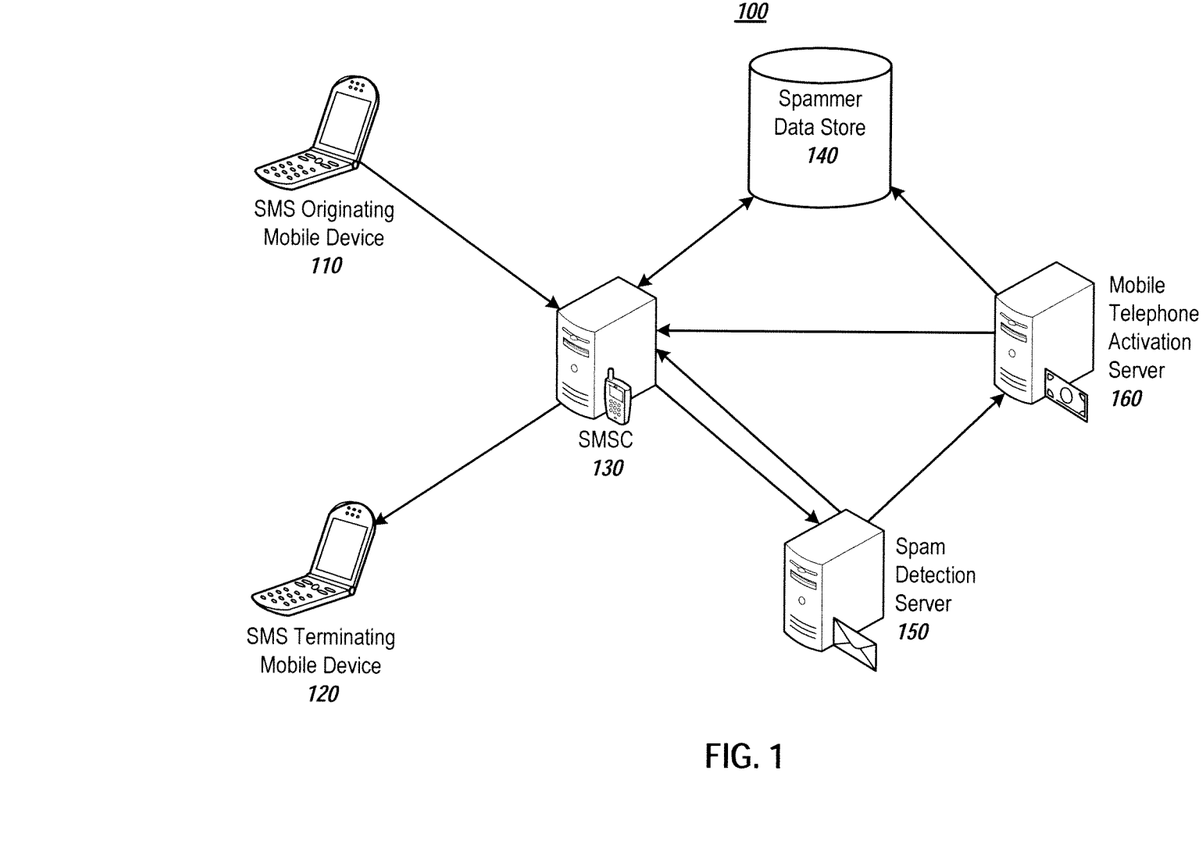
FIG. 1 is a high-level functional block diagram of a simplified example of a mobile communication system that provides a mobile messaging service and supports an example of an associated service for identifying and blocking mobile messaging service spam.

Reference now is made in detail to the examples illustrated in the accompanying drawings and discussed below. FIG. 1 is a high-level functional block diagram of a simplified example of a mobile communication system 100 that provides a mobile messaging service and supports an example of an associated service for identifying and blocking mobile messaging service spam. While the system 100 of FIG. 1 is illustrated as transmitting SMS messages between mobile telephones, the system 100 can also be used for transmitting messages using other mobile messaging services, for example, EMS or MMS. Also, the system 100 can be used with devices other than mobile telephones. For example, a tablet computer or a personal digital assistant (PDA) connected to a cellular network can replace one or more of the illustrated mobile telephones 110 and 120. The tablet computer or PDA can be associated with an account for transmitting message(s) in a mobile network and, in some aspects, is not associated with a telephone number. For example, the tablet computer or PDA can be associated with an electronic messaging address (e.g., an email address) or other account identifier of an account that is capable of transmitting message via the mobile messaging service. As shown, the mobile communications system 100 includes a SMS originating mobile device 110, a SMS terminating mobile device 120, a short message service center (SMSC) 130, a spammer data store 140, a spam detection server 150, and a mobile telephone activation server 160.

The computing devices 110, 120, 130, 140, 150, and 160 communicate with one another over a network connection. The network connection can include one or more of a cellular network, a WiFi network, a local area network, a wide area network, a wireless connection, or a wired connection. The SMS originating mobile device 110 is configured to receive a user input of a SMS message to be transmitted to the SMS terminating mobile device 120. An SMS message can be transmitted from the SMS originating mobile device 110 to a single SMS terminating mobile device or to multiple SMS terminating mobile devices. In some aspects, SMS messages can be transmitted to a software program rather than a physical device (e.g., a software program that provides, via SMS, a weather forecast in response to receiving a zip code or a city and state). The SMS terminating mobile device 120 is configured to receive an incoming SMS message, for example, from the SMS originating mobile device 110. In some aspects, the SMS originating mobile device 110 or the SMS terminating mobile device 120 can be a mobile phone, a tablet computer, a PDA, a software program, etc. The SMS originating mobile device 110 is a device transmitting a message via the mobile messaging service. The SMS terminating mobile device 120 is a device to which the message is transmitted via the mobile messaging service. For example, if a child uses his or her mobile phone to transmit a message, "I am done with school. Can you pick me up?" to his parent's smart phone, the child's mobile phone is the SMS originating mobile device 110 and the parent's smart phone is the SMS terminating mobile device 120.

The SMSC 130 is configured to receive a transmitted mobile messaging service (e.g., SMS) message from the SMS originating mobile device 110 and forward the message to the SMS terminating mobile device 120. In some aspects, the SMSC verifies additional information (e.g., billing information) about the SMS originating mobile device 110 or the SMS terminating mobile device 120 before forwarding the message.

The spammer data store 140 stores information identifying mobile device(s) that are associated with spammers. The mobile devices may be identified by an identifier of the mobile device, an identifier of an account with a mobile service provider, or a telephone number. The identifier of the mobile device can be one or more of an International Mobile Equipment Station Identity (IMEI) number, a mobile device number (MDN), an account number with a mobile communication service provider, etc. The information identifying mobile device(s) that are associated with spammers can be a data structure (e.g., a list, an array, a queue, a stack, etc.) storing identifier(s) of mobile device(s) that are associated with spammers.

The spam detection server 150 is configured to detect whether a mobile messaging service (e.g., SMS) message is a spam message. The spam detection server 150 may determine whether a given message is a spam message based on the content of the payload of the message, velocity or volume of message(s) from the origin of the message, and/or the presence of malicious link(s) in the message. The content of the payload could refer to whether the payload includes non-profane text corresponding to words in a natural language (e.g., the English language), profanity in a natural language, or text that does not correspond to words in a natural language. For example, non-spam messages are likely to include non-profane text corresponding to words in a natural language, while spam messages may include profanity or text that does not correspond to words in a natural language. However, it should be noted that some non-spam messages may include profanity or text that does not correspond to words in a natural language known to the spam detection server 150. For example, a message that includes profanity or text that does not correspond to words in a natural language may, in some cases, not be a spam message if it is transmitted to a small number of recipients (e.g., sexting or transmitting a sexually explicit mobile messaging service message to a single recipient to whom one is close, or transmitting a joke that includes profanities to a small number of recipients). In addition, the spam detection server may be unfamiliar with certain foreign first or last names or text that is transliterated into English characters from a foreign language (e.g., Russian words written with English characters). Velocity of messages may refer to a number of messages transmitted per unit time (e.g., a number of messages per minute). In some examples, a message is more likely to be a spam message if the velocity of messages being transmitted from the SMS originating mobile device 110 exceeds a threshold velocity (e.g., 20 messages per minute). Volume of messages may refer to a total number of messages transmitted over an extended time period (e.g., 10,000 messages in a day). In some examples, a message is more likely to be a spam message if the volume of messages being transmitted from the SMS originating mobile device 110 exceeds a threshold volume (e.g., 5,000 messages). Messages being transmitted with a higher velocity or volume are more likely to be spam messages than messages being transmitted with a lower velocity or volume. In some cases, certain mobile messaging service message sources may be "white listed" or excluded from the velocity and volume spam detection rules set forth above. For example, a newspaper may transmit a high velocity or a high volume of mobile messaging service messages to alert subscribers about an important news story. In addition, companies or political organizations may transmit a high velocity or a high volume of mobile messaging service messages during certain times (e.g., product releases or elections). A white list of the excluded mobile messaging service message sources can be stored at one or more of the spam detection server 150, the mobile telephone activation server 160, the spammer data store 140, or the SMSC 130.

In some examples, whether a message is a spam message may be determined, in part, based on a geographic location from which the message was sent or a geographic location to which the message was directed. For example, spam messages may be more likely to be transmitted from Miami, Fla., to Los Angeles, Calif., than from Peoria, Ill., to Gary, Ind.

In some examples, whether a message is a spam message may be determined, in part, using a set of adaptive thresholds. For example, a message from a source that has never been identified as a spam source may need to meet a very high threshold, based on multiple factors specified above, to be classified as spam. However, a message from a source that has been classified as a spam source previously (but is currently not classified as a spam source) may need to meet a lower threshold, based on fewer of the factors specified above, to be classified as spam.

The mobile telephone activation server 160 is configured to store user (subscriber) information, e.g., customer profiles associated with mobile devices in the mobile communications system 100. The user information may include account information, account status, user preferences, features subscribed to by the user, and user's current location. The account information may include information about the MDN and the capability of the user's devices 110 and 112 and an identity of network with which the mobile devices 110 and 112 are registered. The mobile devices may be identified by device identifier, by account identifier, or by telephone number.

In some aspects, the subject technology provides techniques for identifying and blocking SMS (or other mobile messaging service) spam. According to some aspects, the SMS originating mobile device 110 generates a request to transmit a first SMS (or other mobile messaging service) message to a SMS terminating mobile device 120. Initially, the SMS originating mobile device 110 may not be flagged as a spammer. In response to the request and determining that the originating mobile device 110 is not flagged as a spammer, the first SMS message is transmitted from the SMS originating mobile device 110 to the SMSC 130 short message service center 130. Upon determining that the SMS originating mobile device 110 is not flagged as a spammer (e.g., by reviewing data stored in the spammer data store 140), the SMSC 130 transmits the first SMS message to the SMS terminating mobile device 120 and to the spam detection server 150. In some examples, the SMSC 130 transmits the first SMS message to the SMS terminating mobile device 120 and to the spam detection server 150 simultaneously and in parallel. Alternatively, the SMSC 130 transmits the first SMS message to the SMS terminating mobile device 120 and the spam detection server 150 in series. In some examples, the SMSC transmits the first SMS message to the spam detection server 150 before receiving a confirmation, from the SMS terminating mobile device 120, that the SMS terminating mobile device 120 received the message. Alternatively, the SMSC transmits the first SMS message to the SMS terminating mobile device 120 before receiving a confirmation, from the spam detection server 150, that the spam detection server 150 received the message. The spam detection server 150 determines whether the first SMS message is a spam message. The spam detection server 150 may determine whether the first SMS message is a spam message based on the content of the payload of the first SMS message, velocity or volume of message(s) from the SMS originating mobile device 110, or the presence of malicious link(s) in the first SMS message.

If the spam detection server 150 determines that the first SMS message is a spam message, the spam detection server 150 notifies the mobile telephone activation server 160 that the SMS originating mobile device 110 should be flagged as a spammer, and the mobile telephone activation server 160 notifies the SMSC 130 to update updates the spammer data store 140 to reflect that the SMS originating mobile device 110 is flagged as a spammer. Alternatively, the mobile telephone activation server 160 updates the spammer data store 140. The spammer data store 140 could be notified that the SMS originating mobile device 110 should be flagged as a spammer using one or more identifiers including an account number, a mobile telephone number, a MDN, an IMEI number, or a customer profile of the SMS originating mobile device 110. The one or more identifiers used to notify the spammer data store 140 that the SMS originating mobile device 110 should be flagged as a spammer are included in the message received at the SMSC 130 from the SMS originating mobile device 110.

According to some aspects, after being flagged as a spammer in the spammer data store 140, the SMS originating mobile device 110 attempts to transmit a second SMS message to the SMS terminating mobile device 120 (or another mobile device). The second SMS message is transmitted from the SMS originating mobile device 110 to the SMSC 130. The SMSC 130 determines, based on information residing in the spammer data store 140, that the SMS originating mobile device 110 is flagged as a spammer. In response to the determination that the SMS originating mobile device 110 is flagged as a spammer, the SMSC 130 transmits the second SMS message to the spam detection server 150 to determine, at the spam detection server 150, whether the second SMS message is a spam message. At the spam detection server 150, the second SMS message is flagged as more likely to be a spam message (than a message from a mobile device that is not flagged as a likely spammer) due to the fact that past message(s) from the SMS originating mobile device 110 were flagged as spam. The spam detection server 150 may check the spammer data store 140 to determine whether the SMS originating mobile device 110 is flagged as a spammer. If the second SMS message is determined to be a spam message, the SMSC 130 does not transmit the second SMS message to the SMS terminating mobile device 120. However, the SMSC 130 may notify the SMS originating mobile device 110 that the second SMS message was successfully transmitted to the SMS terminating mobile device (e.g., so that the SMS originating mobile device 110 does not attempt to automatically retransmit the second SMS message or so that the user of the SMS originating mobile device 110 does not attempt to manually retransmit the second SMS message). If the second SMS message is not determined to be a spam message, the SMSC 130 transmits the second SMS message to the SMS terminating mobile device 120.

In some aspects, a SMS originating mobile device 110 that is flagged as a spammer in the spammer data store 140 may be unflagged as a spammer (and treated as a non-spammer mobile device by the SMSC 130) after the SMS originating mobile device 110 does not transmit spam messages (as detected by the spam detection server 150) for a predetermined time period (e.g., 24 hours, 48 hours, 72 hours, one week, or two weeks). In some aspects, the spam detection server 150 and the mobile telephone activation server 160 also store data structure(s) about whether a specific mobile device is a spammer, and these data structures are updated if a mobile device flagged as a spammer does not transmit spam messages for the predetermined time period. In some aspects, a mobile device (e.g., SMS originating mobile device 110) that is flagged as a spammer is not notified that the mobile device has been flagged as a spammer. As a result, a user of the mobile device that is flagged as a spammer is unable to develop a work-around to the spammer flag or adjust his/her behavior to send spam messages without being flagged as a spammer.

Advantageously, as a result of some implementations of the subject technology, the SMSC 130 filters spam messages from known spammers while delivering non-spam messages from senders (both known spammers and mobile devices not identified as spammers).

Figure 2:
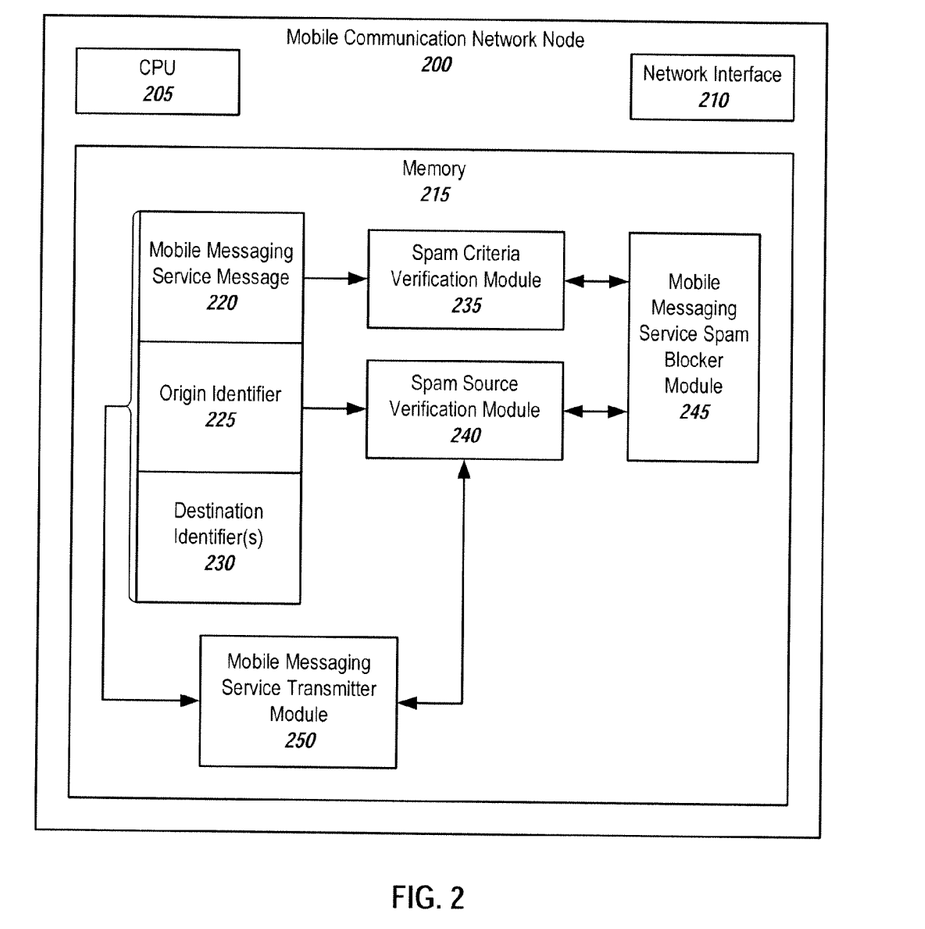
FIG. 2 is a high-level functional block diagram of an exemplary mobile communication network node.

FIG. 2 is a high-level functional block diagram of an exemplary mobile communication network node 200. In some examples, the mobile communication network node 200 corresponds to the SMSC 130 of FIG. 1.

As shown, the mobile communication network node 200 includes a central processing unit (CPU) 205, a network interface 210, and a memory 215. The CPU 205 may include one or more processors. The CPU 205 is configured to execute machine instructions that are stored in a machine readable medium, for example, the memory 215. The network interface 210 is configured to allow the mobile communication network node 210 to transmit and receive data in a network, e.g., a mobile communication network, which can be, for example, a cellular network. The network interface 210 may include one or more network interface cards (NICs). The memory 215 stores data or instructions. The memory 215 may be one or more of a cache unit, a storage unit, an internal memory unit, or an external memory unit. As illustrated, the memory 215 includes a mobile messaging service (e.g., SMS, EMS, or MMS) message 220 having an origin identifier 225 and destination identifier(s) 230, a spam criteria verification module 235, a spam source verification module 240, a mobile messaging service spam blocker module 245, and a mobile messaging service transmitter module 250. The mobile messaging service message 220 can be the message transmitted from the SMS originating mobile device 110 to the SMS terminating mobile device 120 described in conjunction with FIG. 1.

The mobile messaging service message 220 has an origin identifier 225 identifying the source of the message and destination identifier(s) 230 identifying recipient(s) of the message. The origin identifier 225 or the destination identifier(s) 230 can be one or more of a telephone number, a device identifier, or an account identifier. For example, in the approach described in FIG. 1, the origin identifier 225 can be an MDN of the SMS originating mobile device 110 and the destination identifier 230 can be an MDN of the SMS terminating mobile device 120.

The spam criteria verification module 235 is configured to determine whether the mobile messaging service message 220 is a spam message. The spam criteria verification module 235 may operate by communication with the spam detection server 150 or by locally analyzing the mobile messaging service message 220. In keeping with the previous example described with respect to FIG. 1, the spam criteria verification module 235, upon receiving the mobile messaging service message 220 from the SMS originating mobile device 110 and determining that the SMS originating mobile device 110 is not flagged as a spammer, forwards the mobile messaging service message to the spam detection server 150 and simultaneously forwards the mobile messaging service message to the device(s) identified by the destination identifier(s) 230 (e.g., SMS terminating mobile device 120). In some implementations, the spam criteria verification module 235 accesses the spam source verification module 240 to determine whether the SMS originating mobile device 110 has been previously identified as a spammer, in which case the mobile communication network node 200 will not forward the mobile messaging service message 220 the device(s) identified by the destination identifier(s) 230 until the spam criteria verification module 235 verifies that the mobile messaging service message 220 is not a spam message (e.g., via operation of the spam detection server 150).

The spam source verification module 240 is configured to determine whether the origin of the mobile messaging service message 220, identified by the origin identifier 225, is a known spam source. The spam source verification module 240 may operate by reviewing information stored in the spammer data store 140 or by reviewing locally stored information. Upon verifying that the origin of the mobile messaging service message 220 is a known spam source, the spam source verification module 240 informs the mobile messaging service spam blocker module 245. In response, the mobile messaging service spam blocker module 245 prevents transmission of the mobile messaging service message 220, via the mobile messaging service transmitter module 250, to the destination(s) identified by the destination identifier(s) 230.

The mobile messaging service transmitter module is configured to transmit the mobile messaging service message 220 to one or more of the recipient(s) of the mobile messaging service message 220 identified by the destination identifier(s) 230 after the fact that either the device identified by the origin identifier 225 is not flagged as a spammer or the mobile messaging service message 220 is not a spam message.

The mobile messaging service spam blocker module 245 is configured to determine, via the spam source verification module 240, if the source of the mobile messaging service message 220, identified by the origin identifier 225, corresponds to a known spammer. If not, the mobile messaging service spam blocker module 245 is configured to simultaneously transmit the mobile messaging service message 220 via the mobile messaging service transmitter module 250 and verify whether the mobile messaging service message 220 is a spam message via the spam criteria verification module 235. If the spam criteria verification module 235 determines that the message 220 is a spam message, the source of the message 220 is flagged as a spammer, for example, in the spammer data store 140 and/or on the spam source verification module 240.

If the source of the mobile messaging service message 220, identified by the origin identifier 220, corresponds to a known spammer, the mobile messaging service spam blocker module 245 first verifies, via the spam criteria verification module 235, whether the message 220 is a spam message. If the message 220 is not determined, by the spam criteria verification module 235, to be a spam message, the mobile messaging service spam blocker module 245 causes transmission of the message 220 via the mobile messaging service transmitter module 250. If the message 220 is determined, by the spam criteria verification module 235, to be a spam message, the mobile messaging service spam blocker module 245 foregoes transmitting the message 220 to the recipient(s), identified by the destination identifier(s) 230. However, the mobile messaging service spam blocker module 245 provides, to the origin of the message 220, identified by the origin identifier 225, an indication that the message was transmitted. As a result, the origin of the message 220 does not attempt to re-transmit the message 220.

FIG. 2 implies some examples of the subject technology, where the spam criteria verification module 235, the spam source verification module 240, and the mobile messaging service spam blocker module 245 reside on the SMSC 130. However, in some other examples, one or more of where the spam criteria verification module 235, the spam source verification module 240, or the mobile messaging service spam blocker module 245 can reside on other node(s) of the mobile communication system 100, for example, at the spam detection server 150. In implementations where the spam criteria verification module 235, the spam source verification module 240, and the mobile messaging service spam blocker module 245 reside at the spam detection server, the SMSC 130 can store a true/false or on/off indicator regarding whether a source of mobile messaging service messages is a spam source.

Figure 3A:
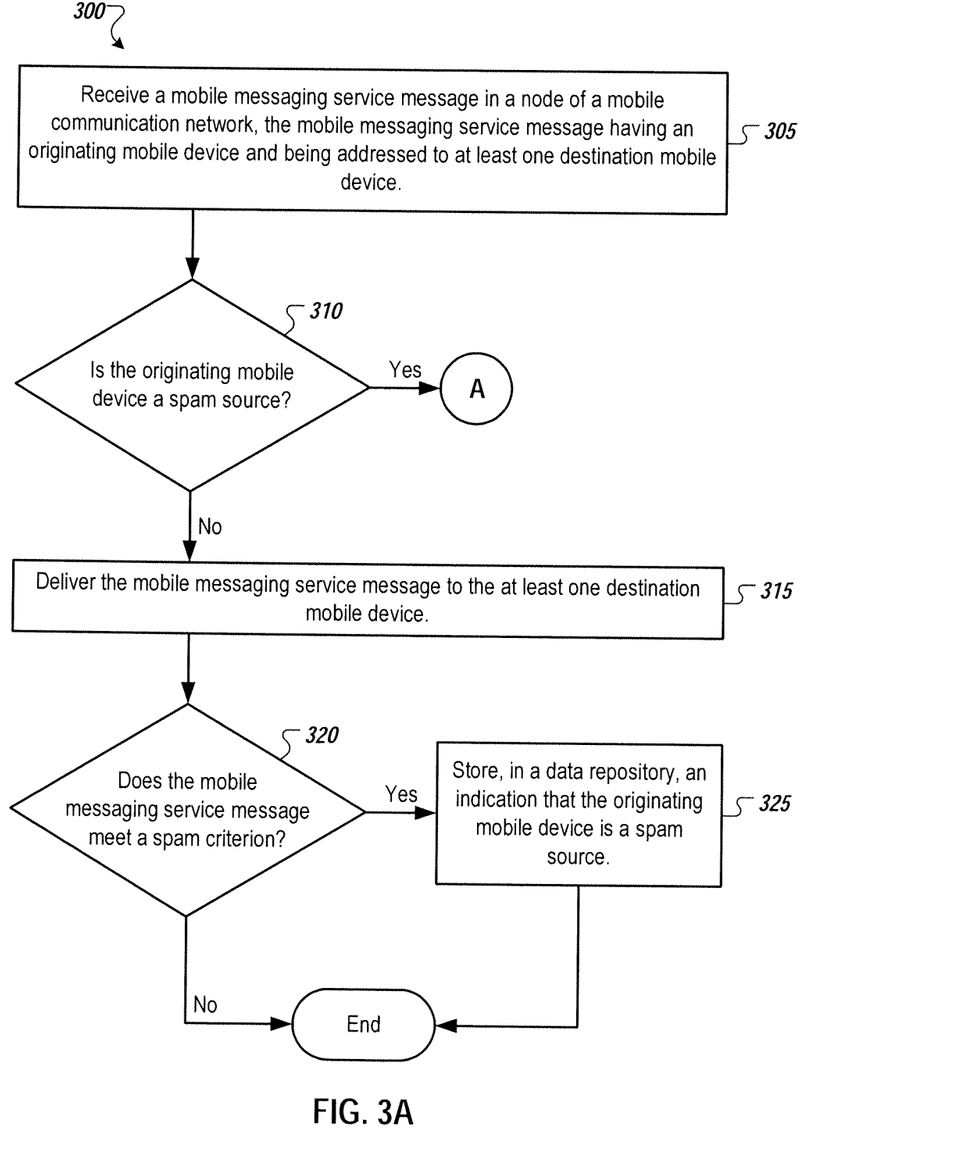
FIGS. 3A-3B together form a flow chart of a process for identifying and blocking mobile messaging service spam.
Figure 3B:
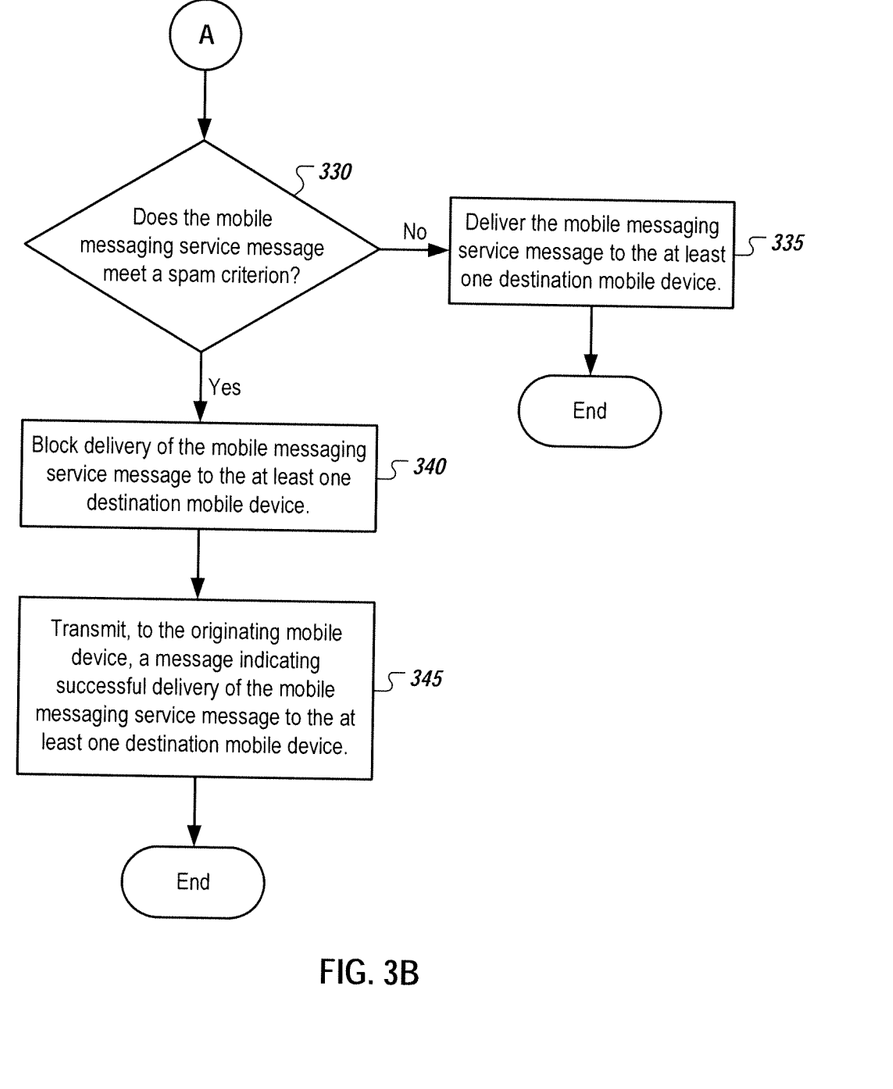

FIGS. 3A-3B illustrate a flow chart of a process 300 for identifying and blocking mobile messaging service spam.

As shown in FIG. 3A, the process 300 begins at step 305, where one or more nodes (e.g., SMSC 130 and spam detection server 150 of FIG. 1) receive a mobile messaging service (e.g., SMS, EMS, or MMS) message. The mobile messaging service message may be originated from mobile device 110 and may be addressed to at least one destination mobile device e.g., mobile device 120.

In step 310, the one or more nodes determine whether the originating mobile device is a spam source. A data structure representing one or more spam sources can be stored in a data store (e.g., spammer data store 140) that is accessible to the node. If the originating mobile device is not determined to be a spam source, the process 300 continues to step 315. If the originating mobile device is determined to be a spam source, the process 300 continues to step 330, as shown in FIG. 3B.

In step 315, upon determining that the originating mobile device is not a spam source, the one or more nodes deliver the mobile messaging service message to at least one destination mobile device. For example, the one or more nodes can forward the message through the mobile communication network to the destination mobile device.

In step 320, the one or more nodes determine whether the mobile messaging service message meets a spam criterion. The one or more nodes may transmit the message to a spam detection server (e.g., spam detection server 150), for determination whether the message meets the spam criterion at the spam detection server. Alternatively, the determination whether the message meets the spam criterion may be made locally at the one or more nodes. The spam criterion may include one or more of: whether the content of the payload of the message is intelligible in a natural language, whether the content of the payload of the message lacks profanity in a natural language, velocity or volume of message(s) from the origin of the message, the presence of malicious link(s) in the message, or any other criterion used to identify spam message(s). In some aspects, step 320 is executed in parallel with step 315. For example, the one or more nodes simultaneously (i) determines whether the message meets the spam criterion and (ii) delivers the message to the destination mobile device. If the message does not meet the spam criterion, the process 300 ends. If the message meets the spam criterion, the process 300 continues to step 325.

In step 325, if the message meets the spam criterion, the one or more nodes store, in a data repository (e.g., spammer data store 140), an indication that the originating mobile device is a spam source. In some aspects, the one or more nodes transmit a signal to the data repository to update the data repository. Alternatively, another machine on the network (e.g., mobile telephone activation server 160) may transmit a signal to the data repository to update the data repository. In some aspects, the indication that the originating mobile device is a spam source is removed after the originating mobile device does not send any messages that are identified as spam messages for a predetermined time period (e.g., 24 hours, 48 hours, 72 hours, one week, or two weeks). After step 325, the process 300 ends.

As shown in FIG. 3B, in step 330, upon determining that the originating mobile device is a spam source, the one or more nodes determine whether the mobile messaging service message meets a spam criterion. In some examples, the one or more nodes determine whether the mobile messaging service message meets the spam criterion based on analyzing one or more of: content of a payload of the first messaging service message, velocity or volume of messaging service messages received through the mobile communication network from the messaging source and presence of a malicious link in the first mobile messaging service message. The one or more nodes may transmit the message to a spam detection server (e.g., spam detection server 150), for determination whether the message meets the spam criterion at the spam detection server. Alternatively, the determination whether the message meets the spam criterion may be made locally at the one or more nodes. The spam criterion may include one or more of: whether the content of the payload of the message is intelligible in a natural language, whether the content of the payload of the message lacks profanity in a natural language, velocity or volume of message(s) from the origin of the message, the presence of malicious link(s) in the message, or any other criterion used to identify spam message(s). If the mobile messaging service message does not meet the spam criterion, the process 300 continues to step 335. If the mobile messaging service message meets the spam criterion, the process 300 continues to step 340.

In step 335, upon determining that the mobile messaging service message does not meet the spam criterion, the one or more nodes deliver the mobile messaging service message, via a communications network, to the at least one destination mobile device. After step 335, the process 300 ends.

In step 340, upon determining that the mobile messaging service message meets the spam criterion, the one or more nodes block delivery of the mobile messaging service message to the at least one destination mobile device.

In step 345, the one or more nodes transmit, to the originating mobile device, a confirmation message indicating successful delivery of the mobile messaging service message to the at least one destination mobile device. As a result of receiving the confirmation message, the originating mobile device may, in some aspects, not attempt to re-transmit (e.g., either automatically or manually by operation of the originating mobile device by the user of the originating mobile device) the mobile messaging service message. After step 345, the process 300 ends.

Figures 4, 5:
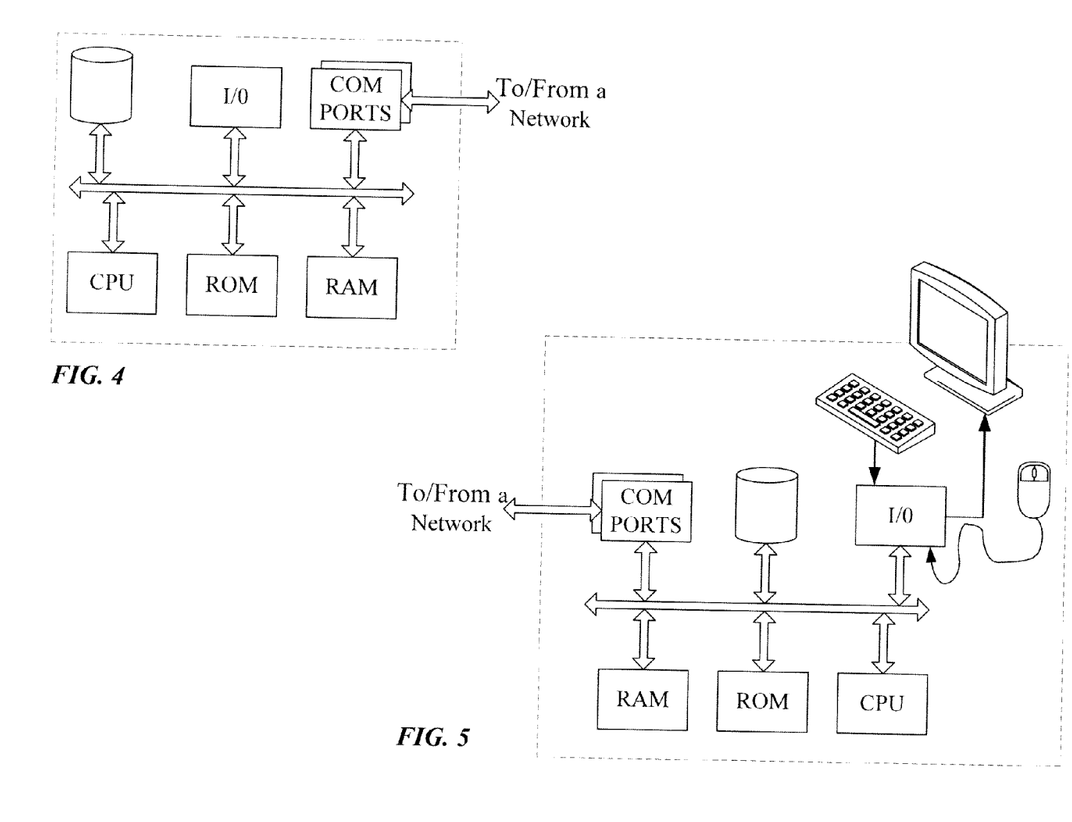
FIG. 4 is a simplified functional block diagram of a computer that may be configured as a host or server.
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server, for example, the SMSC 130, the spam detection server 150, or the mobile telephone activation server 160. FIG. 5 depicts a computer with user interface elements, as may be used to implement a personal computer or other type of work station or terminal device, although the computer of FIG. 5 may also act as a server if appropriately programmed. It is believed that the general structure and general operation of such equipment as shown in FIGS. 4 and 5 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 5). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of identifying and blocking mobile messaging service spam outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the a service provide into the computer platform of the node that will be the short messaging service center 130 or the mobile communication network node 200. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the process(es), computing device(s) or module(s), etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. For example, although the originating device (e.g., SMS originating mobile device 110) is described as being associated with a MDN, in accordance with the subject technology, message(s) may originate from a server or from equipment of a value-added service provider that is no associated with a MDN. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising steps of:
   receiving a first mobile messaging service message from a messaging source in a node of a mobile communication network, the first mobile messaging service message being addressed to a destination mobile device, the messaging source not currently identified as a spam source;
   forwarding the first mobile messaging service message through the mobile communication network for delivery to the destination mobile device;
   determining whether or not the first mobile messaging service message meets a spam messaging criterion, wherein determining whether or not the first mobile messaging service message meets the spam messaging criterion occurs in parallel with the forwarding of the first mobile messaging service message through the mobile communication network for delivery to the destination mobile device; and
   storing information identifying the messaging source as a spam source, upon determining that the first mobile messaging service message meets the spam messaging criterions;
   wherein at least one of:
   (i) the method further comprises steps of:
      receiving a second mobile messaging service message from the messaging source in a node of the mobile communication network;
      upon determining, using the stored information, that the second mobile messaging service message originated from a spam source, analyzing the second mobile messaging service message to determine whether or not the second mobile messaging service message is a spam message;
      blocking delivery of the second mobile messaging service message through the mobile communication network in response to the determination that the second mobile messaging service message is a spam message; and
      transmitting a message to the messaging source indicating successful transmission of the second mobile messaging service message through the mobile communication network; and
   (ii) determining whether or not the first mobile messaging service message meets the spam messaging criterion is based on analyzing a set of factors comprising one or more of: content of a payload of the first messaging service message, velocity or volume of messaging service messages received through the mobile communication network from the messaging source and presence of a malicious link in the first mobile messaging service message, and determining whether or not the first mobile messaging service message meets the spam messaging criterion is completed using an adaptive threshold computed using the set of factors, the adaptive threshold being based on whether the messaging source has been previously identified as a spam source or on whether the messaging source has never been identified as a spam source.

2. The method of claim 1, wherein case (ii) applies, the method further comprising:
   receiving a second mobile messaging service message from the messaging source in a node of the mobile communication network;
   upon determining, using the stored information, that the second mobile messaging service message originated from a spam source, analyzing the second mobile messaging service message to determine whether or not the second mobile messaging service message is a spam message; and blocking delivery of the second mobile messaging service message through the mobile communication network in response to the determination that the second mobile messaging service message is a spam message.

3. The method of claim 2, further comprising transmitting a message to the messaging source indicating successful transmission of the second mobile messaging service message through the mobile communication network.

4. The method of claim 1, further comprising:
   receiving a third mobile messaging service message from the messaging source in a node of the mobile communication network;
   upon determining, using the stored information, that the third mobile messaging service message originated from a spam source, analyzing the third mobile messaging service message to determine whether or not the third mobile messaging service message is a spam message; and
   forwarding the third mobile messaging service message through the mobile communication network for delivery to a destination mobile device identified in the third mobile messaging service message, in response to the determination that the third mobile messaging service message is not a spam message.

5. The method of claim 1, wherein case (i) applies, and wherein the step of determining whether or not the first mobile messaging service message meets the spam messaging criterion is based on analyzing a set of factors comprising one or more of: content of a payload of the first messaging service message, velocity or volume of messaging service messages received through the mobile communication network from the messaging source and presence of a malicious link in the first mobile messaging service message.

6. The method of claim 5, wherein the step of determining whether or not the first mobile messaging service message meets the spam messaging criterion is completed using an adaptive threshold computed using the set of factors, the adaptive threshold being based on whether the messaging source has been previously identified as a spam source or on whether the messaging source has never been identified as a spam source.

7. The method of claim 1, further comprising:
determining, after storing the information identifying the messaging source as the spam source, that the messaging source has not transmitted any spam messages for a predetermined time period starting after storing the information identifying the messaging source as the spam source; and
overwriting, to indicate that the messaging source is not the spam source, the information identifying the messaging source as the spam source responsive to determining that the messaging source has not transmitted any spam messages for the predetermined time period.

8. The method of claim 1, wherein the first mobile messaging service message comprises one of a short messaging service (SMS) message, an enhanced messaging service (EMS) message, or a multimedia messaging service (MMS) message.

9. The method of claim 1, wherein the messaging source comprises a mobile device associated with a mobile device number (MDN).

10. The method of claim 1, wherein forwarding the first mobile messaging service message through the mobile communication network for delivery to the destination mobile device comprises forwarding, regardless of whether the first mobile messaging service message meets the spam messaging criterion, the first mobile messaging service message through the mobile communication network for delivery to the destination mobile device.

11. The method of claim 1, wherein the spam messaging criterion comprises a criterion based on a geographic location of the messaging source.

12. The method of claim 1, wherein the spam messaging criterion comprises a criterion based on a geographic location of the destination mobile device.

13. A non-transitory machine readable medium comprising instructions which, when executed by one or more computing devices, cause the one or more computing devices to:
receive a first mobile messaging service message from a messaging source in a node of a mobile communication network, the first mobile messaging service message being addressed to a destination mobile device;
forward the first mobile messaging service message through the mobile communication network for delivery to the destination mobile device;
determine whether or not the first mobile messaging service message meets a spam messaging criterion, wherein determining whether or not the first mobile messaging service message meets the spam messaging criterion occurs in parallel with the forwarding of the first mobile messaging service message through the mobile communication network for delivery to the destination mobile device; and
store information identifying the messaging source as a spam source, upon determining that the first mobile messaging service message meets the spam messaging criterion;
wherein at least one of:
(i) the non-transitory machine readable medium further comprises instructions which, when executed by the one or more computing devices, cause the one or more computing devices to:
receive a second mobile messaging service message from the messaging source in a node of the mobile communication network;
upon determining, using the stored information, that the second mobile messaging service message originated from a spam source, analyze the second mobile messaging service message to determine whether or not the second mobile messaging service message is a spam message;
block delivery of the second mobile messaging service message through the mobile communication network in response to the determination that the second mobile messaging service message is a spam message; and
transmit a message to the messaging source indicating successful transmission of the second mobile messaging service message through the mobile communication network; and
(ii) determining whether or not the first mobile messaging service message meets the spam messaging criterion is based on analyzing a set of factors comprising one or more of: content of a payload of the first messaging service message, velocity or volume of messaging service messages received through the mobile communication network from the messaging source and presence of a malicious link in the first mobile messaging service message, and determining whether or not the first mobile messaging service message meets the spam messaging criterion is completed using an adaptive threshold computed using the set of factors, the adaptive threshold being based on whether the messaging source has been previously identified as a spam source or on whether the messaging source has never been identified as a spam source.

14. The machine readable medium of claim 13, wherein case (ii) applies, the machine readable medium further comprising instructions which, when executed by the one or more computing devices, cause the one or more computing devices to:
receive a second mobile messaging service message from the messaging source in a node of the mobile communication network;
upon determining, using the stored information, that the second mobile messaging service message originated from a spam source, analyze the second mobile messaging service message to determine whether or not the second mobile messaging service message is a spam message; and
block delivery of the second mobile messaging service message through the mobile communication network in response to the determination that the second mobile messaging service message is a spam message.

15. The machine readable medium of claim 14, further comprising instructions which, when executed by the one or more computing devices, cause the one or more computing devices to transmit a message to the messaging source indicating successful transmission of the second mobile messaging service message through the mobile communication network.

16. The machine readable medium of claim 13, further comprising instructions which, when executed by the one or more computing devices, cause the one or more computing devices to:
receive a third mobile messaging service message from the messaging source in a node of the mobile communication network;
upon determining, using the stored information, that the third mobile messaging service message originated from a spam source, analyze the third mobile messaging service message to determine whether or not the third mobile messaging service message is a spam message; and
forward the third mobile messaging service message through the mobile communication network for delivery to a destination mobile device identified in the third mobile messaging service message, in response to the determination that the third mobile messaging service message is not a spam message.

17. The machine readable medium of claim 13, wherein case (i) applies, and wherein the instructions to determine whether or not the first mobile messaging service message meets the spam messaging criterion are based on analyzing one or more of: content of a payload of the first messaging service message, velocity or volume of messaging service messages received through the mobile communication network from the messaging source and presence of a malicious link in the first mobile messaging service message.

18. The machine readable medium of claim 13, further comprising instructions which, when executed by the one or more computing devices, cause the one or more computing devices to:
determine, after storing the information identifying the messaging source as the spam source, that the messaging source has not transmitted any spam messages for a predetermined time period starting after storing the information identifying the messaging source as the spam source; and
overwrite, to indicate that the messaging source is not the spam source, the information identifying the messaging source as the spam source responsive to determining that the messaging source has not transmitted any spam messages for the predetermined time period.

19. The machine readable medium of claim 13, wherein the first mobile messaging service message comprises one of a short messaging service (SMS) message, an enhanced messaging service (EMS) message, or a multimedia messaging service (MMS) message.

20. The machine readable medium of claim 13, wherein the messaging source comprises a mobile device associated with a mobile device number (MDN).

21. One or more nodes in a mobile communication network, the one or more nodes comprising:
processing hardware;
a network interface for communicating via the mobile communication network; and
a memory comprising instructions which, when executed by the processing hardware, cause the processing hardware to:
receive a first mobile messaging service message from a messaging source in a node of a mobile communication network, the first mobile messaging service message being addressed to a destination mobile device;
forward the first mobile messaging service message through the mobile communication network for delivery to the destination mobile device;
determine whether or not the first mobile messaging service message meets a spam messaging criterion, wherein determining whether or not the first mobile messaging service message meets the spam messaging criterion occurs in parallel with the forwarding of the first mobile messaging service message through the mobile communication network for delivery to the destination mobile device; and
store information identifying the messaging source as a spam source, upon determining that the first mobile messaging service message meets the spam messaging criterion;
wherein at least one of:
(i) the memory further comprises instructions which, when executed by the processing hardware, cause the processing hardware to:
receive a second mobile messaging service message from the messaging source in a node of the mobile communication network;
upon determining, using the stored information, that the second mobile messaging service message originated from a spam source, analyze the second mobile messaging service message to determine whether or not the second mobile messaging service message is a spam message;
block delivery of the second mobile messaging service message through the mobile communication network in response to the determination that the second mobile messaging service message is a spam message; and
transmit a message to the messaging source indicating successful transmission of the second mobile messaging service message through the mobile communication network; and
(ii) determining whether or not the first mobile messaging service message meets the spam messaging criterion is based on analyzing a set of factors comprising one or more of: content of a payload of the first messaging service message, velocity or volume of messaging service messages received through the mobile communication network from the messaging source and presence of a malicious link in the first mobile messaging service message, and determining whether or not the first mobile messaging service message meets the spam messaging criterion is completed using an adaptive threshold computed using the set of factors, the adaptive threshold being based on whether the messaging source has been previously identified as a spam source or on whether the messaging source has never been identified as a spam source.

22. The one or more nodes of claim 21, wherein case (ii) applies, the memory further comprising instructions which, when executed by the processing hardware, cause the processing hardware to:
receive a second mobile messaging service message from the messaging source in a node of the mobile communication network;
upon determining, using the stored information, that the second mobile messaging service message originated from a spam source, analyze the second mobile messaging service message to determine whether or not the second mobile messaging service message is a spam message; and block delivery of the second mobile messaging service message through the mobile communication network in response to the determination that the second mobile messaging service message is a spam message.

23. The one or more nodes of claim 22, the memory further comprising instructions which, when executed by the processing hardware, cause the processing hardware to transmit a message to the messaging source indicating successful transmission of the second mobile messaging service message through the mobile communication network.

24. The one or more nodes of claim 21, the one or more nodes further comprising instructions which, when executed by the processing hardware, cause the processing hardware to:

receive a third mobile messaging service message from the messaging source in a node of the mobile communication network;

upon determining, using the stored information, that the third mobile messaging service message originated from a spam source, analyze the third mobile messaging service message to determine whether or not the third mobile messaging service message is a spam message; and forward the third mobile messaging service message through the mobile communication network for delivery to a destination mobile device identified in the third mobile messaging service message, in response to the determination that the third mobile messaging service message is not a spam message.

\* \* \* \* \*